(12) United States Patent
Low et al.

(10) Patent No.: US 11,226,102 B2
(45) Date of Patent: Jan. 18, 2022

(54) FUEL NOZZLE FOR A GAS TURBINE ENGINE

(71) Applicant: United Technologies Corporation, Farmington, CT (US)

(72) Inventors: Kevin J. Low, Portland, CT (US); Joey Wong, Enfield, CT (US); Chris J. Niggemeier, Williamsport, PA (US)

(73) Assignee: Raytheon Technologies Corporation, Farmington, CT (US)

( * ) Notice: Subject to any disclaimer, the term of this patent is extended or adjusted under 35 U.S.C. 154(b) by 519 days.

(21) Appl. No.: 15/920,993

(22) Filed: Mar. 14, 2018

(65) Prior Publication Data

US 2018/0209652 A1 Jul. 26, 2018

Related U.S. Application Data

(62) Division of application No. 14/775,971, filed as application No. PCT/US2014/026306 on Mar. 13, 2014, now abandoned.

(60) Provisional application No. 61/787,469, filed on Mar. 15, 2013.

(51) Int. Cl.

| | |
|---|---|
| *F23R 3/00* | (2006.01) |
| *F23R 3/28* | (2006.01) |
| *F23D 11/38* | (2006.01) |
| *F02C 7/22* | (2006.01) |
| *F23D 11/10* | (2006.01) |
| *F02C 3/00* | (2006.01) |

(52) U.S. Cl.
CPC ............ *F23R 3/283* (2013.01); *F02C 3/00* (2013.01); *F02C 7/22* (2013.01); *F23D 11/10* (2013.01); *F23D 11/38* (2013.01); *F05D 2220/32* (2013.01); *F05D 2230/60* (2013.01); *F05D 2240/35* (2013.01); *F23R 2900/00017* (2013.01); *Y02T 50/60* (2013.01)

(58) Field of Classification Search
CPC .. F23R 3/283; F23R 3/34; F23R 2900/00017; F02C 7/22; F02C 7/228; F05D 2220/32; F05D 2230/60; F05D 2230/64; F05D 2240/35

See application file for complete search history.

(56) References Cited

U.S. PATENT DOCUMENTS

| | | | |
|---|---|---|---|
| 3,116,606 A | 1/1964 | Dougherty et al. | |
| 5,295,773 A * | 3/1994 | Amoroso | F01D 25/243 403/320 |
| 2004/0040310 A1* | 3/2004 | Prociw | F23D 11/107 60/776 |
| 2005/0060867 A1* | 3/2005 | Schubring | B60J 5/10 29/525.11 |
| 2005/0223709 A1* | 10/2005 | Bleeker | F23R 3/60 60/737 |
| 2007/0130911 A1* | 6/2007 | Goldberg | F02C 9/28 60/39.281 |
| 2007/0137218 A1 | 6/2007 | Prociw et al. | |
| 2008/0098737 A1 | 5/2008 | Haggerty et al. | |
| 2008/0105237 A1 | 5/2008 | Gandza | |
| 2009/0077973 A1* | 3/2009 | Hu | F23R 3/343 60/741 |
| 2010/0058765 A1 | 3/2010 | Duval et al. | |

(Continued)

*Primary Examiner* — Edwin Kang
(74) *Attorney, Agent, or Firm* — Getz Balich LLC (57) ABSTRACT

A fuel nozzle for a combustor a gas turbine engine includes a flange with a first locator.

16 Claims, 10 Drawing Sheets

(56) References Cited

U.S. PATENT DOCUMENTS

| | | | |
|---|---|---|---|
| 2010/0115955 A1* | 5/2010 | Goeke | F02C 9/34 |
| | | | 60/740 |
| 2010/0132363 A1* | 6/2010 | DesChamps | F02C 7/22 |
| | | | 60/740 |
| 2011/0005231 A1 | 1/2011 | Low | |
| 2011/0067403 A1* | 3/2011 | Williams | F23R 3/286 |
| | | | 60/742 |
| 2011/0088409 A1 | 4/2011 | Carlisle | |
| 2014/0271144 A1 | 9/2014 | Landwehr et al. | |
| 2016/0033130 A1* | 2/2016 | Low | F23R 3/283 |
| | | | 60/740 |

* cited by examiner

FUEL NOZZLE FOR A GAS TURBINE ENGINE

This patent application is a divisional of and claims priority to U.S. patent application Ser. No. 14/775,971 filed Sep. 14, 2015, which claims priority to PCT Patent Appln. No. PCT/US14/26306 filed Mar. 13, 2014, which claims priority to U.S. Patent Appln. No. 61/787,469 filed Mar. 15, 2013, which are hereby incorporated herein by reference in their entireties.

BACKGROUND

The present disclosure relates to a gas turbine engine and, more particularly, to a combustor section therefor.

Gas turbine engines, such as those which power modern commercial and military aircraft, include a compressor section to pressurize a supply of air, a combustor section to burn a hydrocarbon fuel in the presence of the pressurized air, and a turbine section to extract energy from the resultant combustion gases.

The combustor section generally includes a multiple of circumferentially distributed fuel nozzles mounted to an engine case to axially project into a forward section of a combustion chamber to supply the fuel to mix with the pressurized air. Different types of fuel nozzle are often located at particular circumferential locations. The fuel nozzles typically have multiple fasteners that utilize an offset fastener pattern to provide mistake proofing. On a lighter weight two-fastener design, however, an offset pattern may be structurally undesirable.

SUMMARY

A fuel nozzle for a combustor of a gas turbine engine according to one disclosed non-limiting embodiment of the present disclosure includes a flange with a first locator.

In a further embodiment of the present disclosure, the first locator extends from the flange in a Z-direction.

In a further embodiment of any of the foregoing embodiments of the present disclosure, the first locator is an integral extension.

In a further embodiment of any of the foregoing embodiments of the present disclosure, the first locator is a pin.

In a further embodiment of any of the foregoing embodiments of the present disclosure, the pin is fixedly mounted within an aperture in the flange.

In a further embodiment of any of the foregoing embodiments of the present disclosure, the first locator is positioned within an extension in the flange.

In a further embodiment of any of the foregoing embodiments of the present disclosure, the flange includes a first and second aperture.

In a further embodiment of any of the foregoing embodiments of the present disclosure, the flange includes a first and second aperture along a common axis.

A combustor section for a gas turbine engine according to another disclosed non-limiting embodiment of the present disclosure includes a diffuser case with a fuel injector mount pad having a second locator, and a fuel injector with a flange having a first locator, wherein the first locator is indexed with the second locator.

In a further embodiment of any of the foregoing embodiments of the present disclosure, the first locator extends from the flange.

In a further embodiment of any of the foregoing embodiments of the present disclosure, the first locator is a pin.

In a further embodiment of any of the foregoing embodiments of the present disclosure, the second locator is a slot.

In a further embodiment of any of the foregoing embodiments of the present disclosure, the first locator is a hole.

In a further embodiment of any of the foregoing embodiments of the present disclosure, the second locator is a pin.

In a further embodiment of any of the foregoing embodiments of the present disclosure, the flange includes a first aperture and a second aperture.

A method of mounting a fuel injector into a combustor of a gas turbine engine according to another disclosed non-limiting embodiment of the present disclosure includes bolting a fuel injector flange to a fuel injector pad; and indexing a first locator that extends from the flange with respect to a second locator defined by the fuel injector pad.

A further embodiment of any of the foregoing embodiments of the present disclosure includes bolting the fuel injector flange to the fuel injector pad with only two (2) bolts.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
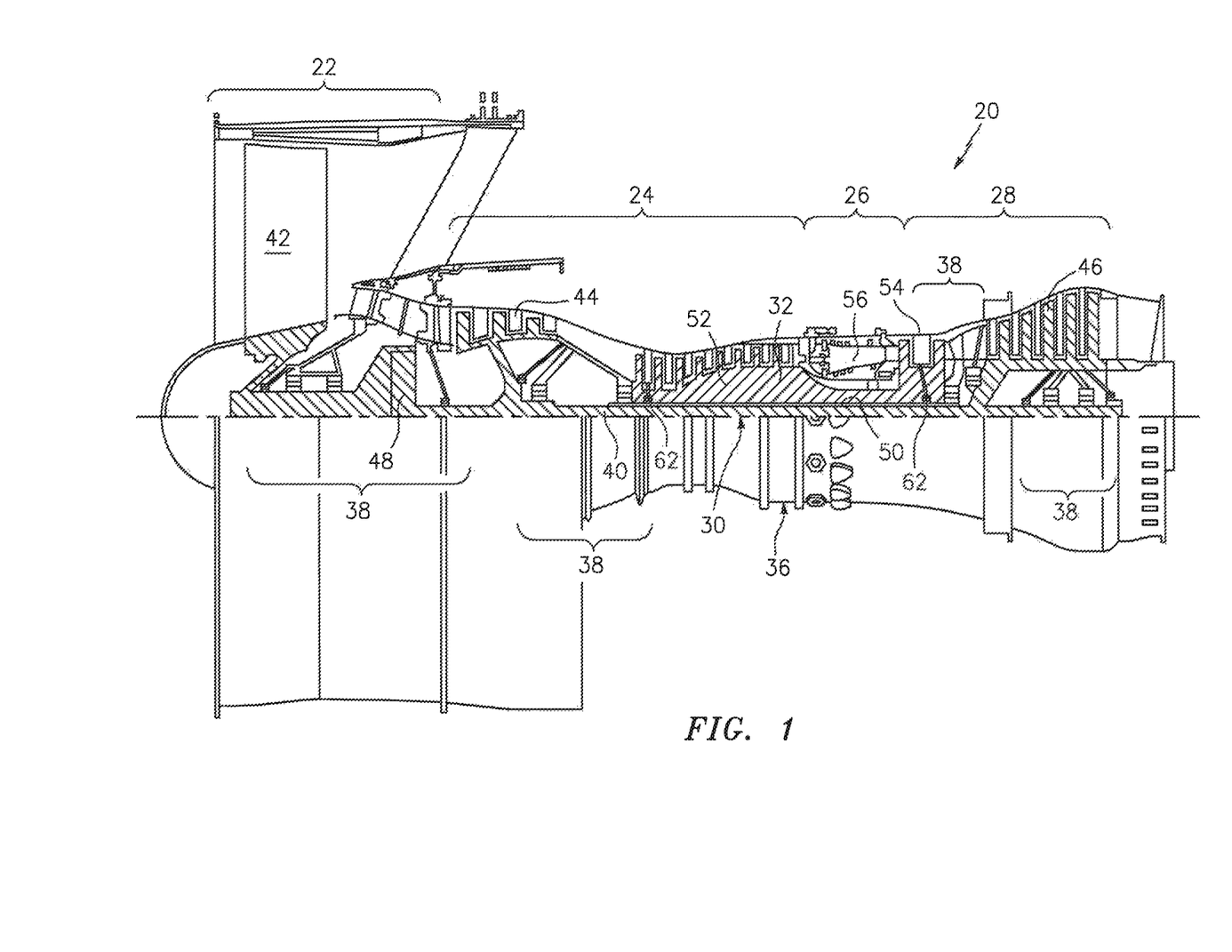
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section and exhaust duct section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $("T"/518.7)^{0.5}$. The Low Corrected Fan Tip Speed according to one non-limiting embodiment of the example gas turbine engine 20 is less than about 1150 fps (351 m/s).

Figure 2:
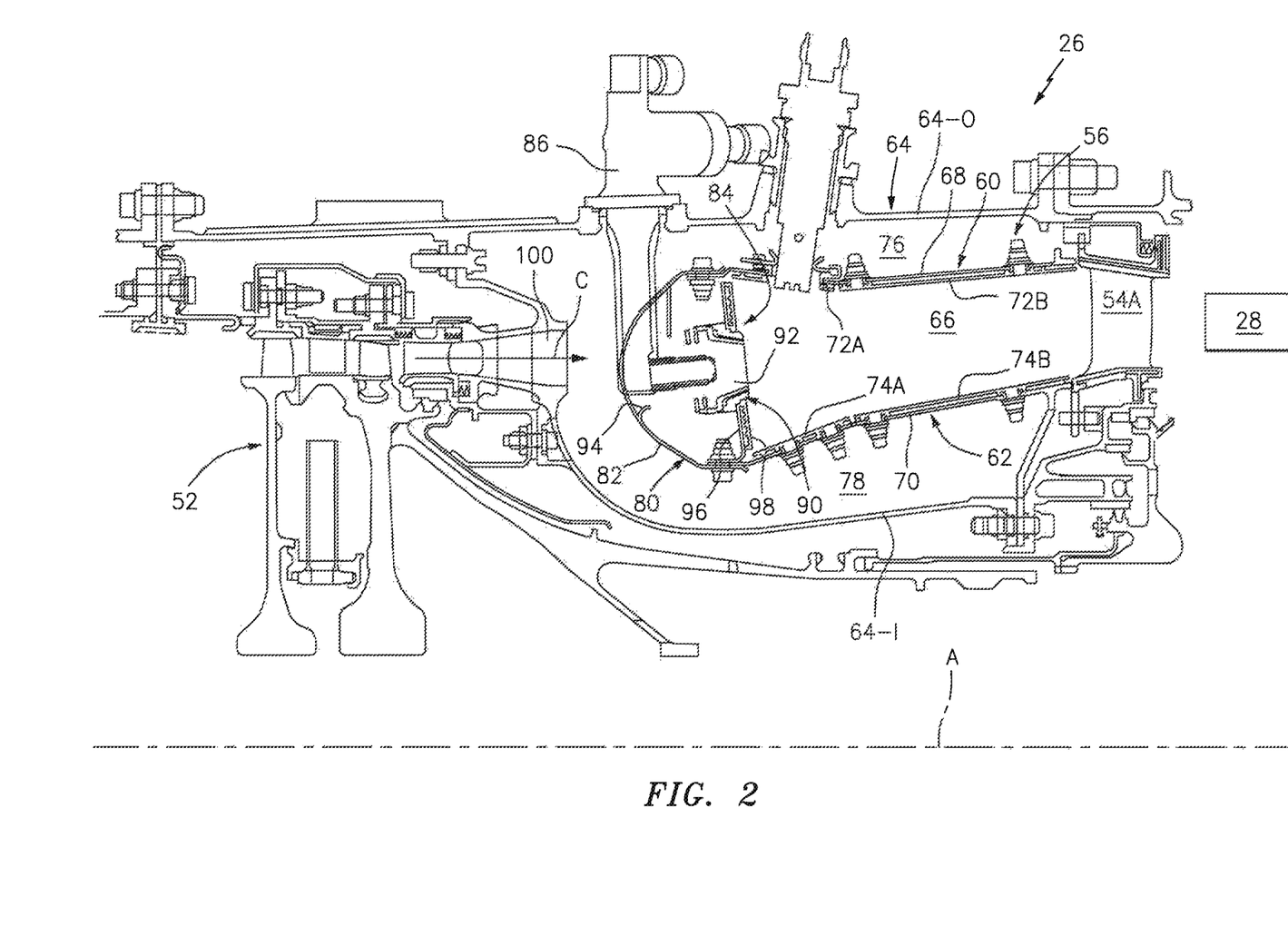
FIG. 2 is an expanded longitudinal schematic sectional view of a combustor section according to one non-limiting embodiment.

With reference to FIG. 2, the combustor 56 generally includes an outer combustor liner assembly 60, an inner combustor liner assembly 62 and a diffuser case 64. The outer combustor liner assembly 60 and the inner combustor liner assembly 62 are spaced apart such that a combustion chamber 66 is defined therebetween. The combustion chamber 66 may be generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68. A multiple of forward liner panels 74A and a multiple of aft liner panels 74B are circumferentially staggered to line the hot side of the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of swirlers 90 (one shown). Each of the swirlers 90 is circumferentially aligned with one of the annular hood ports 94 to project through the bulkhead assembly 84. Each bulkhead assembly 84 generally includes a bulkhead support shell 96 secured to the combustor liner assembly 60, 62, and a multiple of circumferentially distributed bulkhead liner panels 98 secured to the bulkhead support shell 96 around the central opening 92.

The annular hood 82 extends radially between, and is secured to, the forward most ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct the combustion gases onto the turbine blades of the first turbine rotor in the turbine section 28 to facilitate the conversion of pressure energy into kinetic energy. The combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
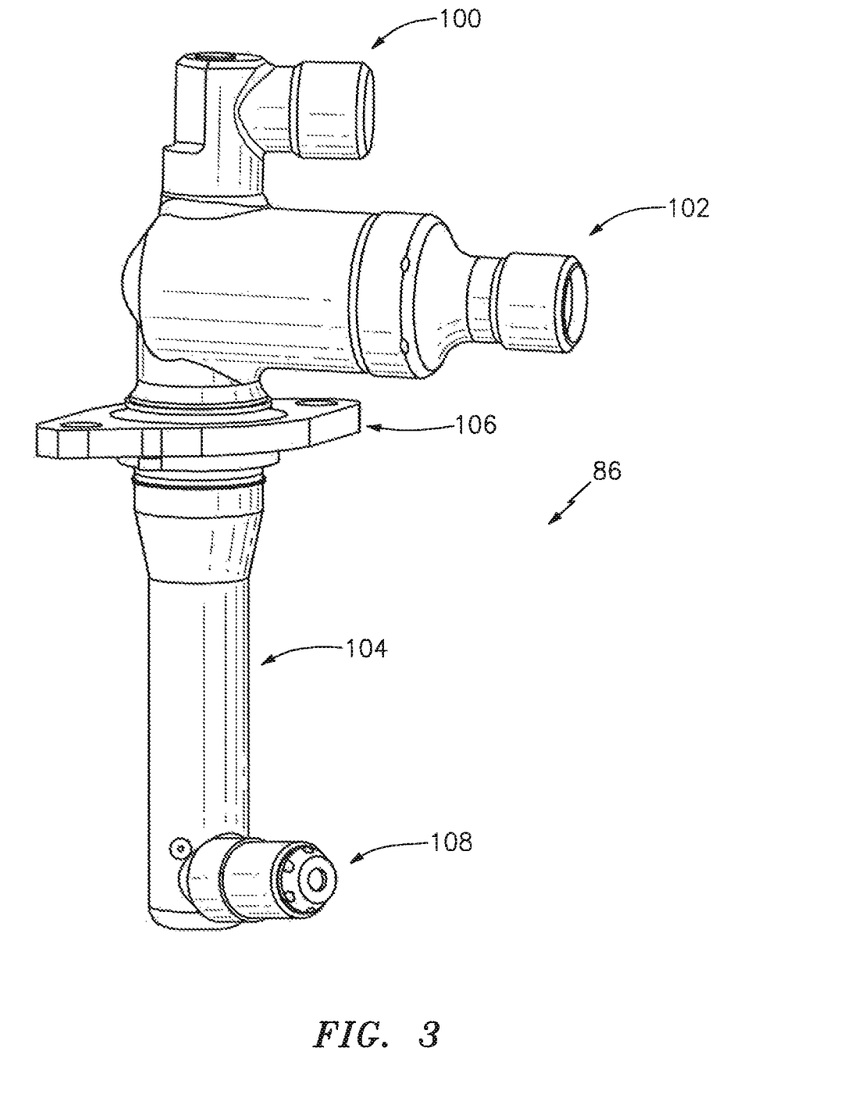
FIG. 3 is an isometric view of a duplex fuel injector.
Figure 4:
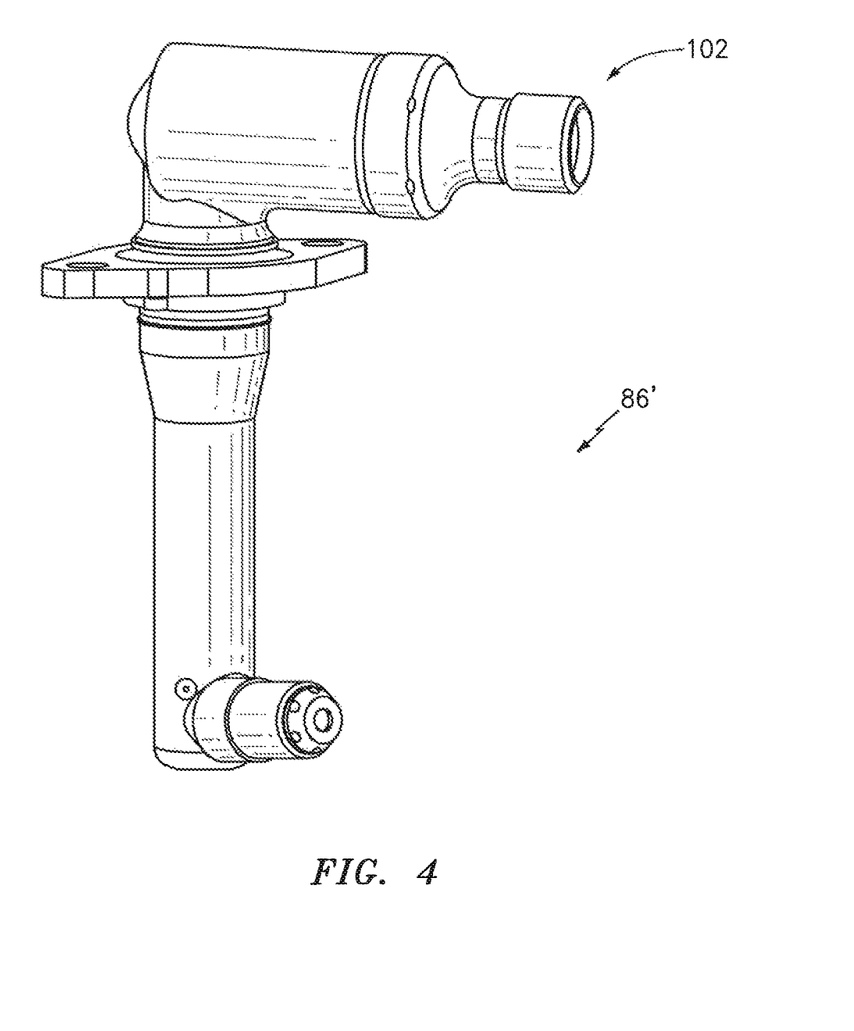
FIG. 4 is an isometric view of a simplex fuel injector.

With reference to FIG. 3, each of the multiple of fuel nozzles 86—illustrated in FIG. 3 as a duplex fuel nozzle—may include a primary inlet 100, a secondary inlet 102, a support 104, a mount flange 106 and a tip 108. The primary inlet 100 receives approximately twenty (20) pounds per hour (pph) of fuel while the secondary inlet 102 receives between approximately twenty-nine (29) to four hundred (400) pph of fuel depending on flight condition. A simplex fuel nozzle 86' only includes the secondary inlet 102 (FIG. 4) as additional steams are not provided as in the duplex nozzle.

Figure 5:
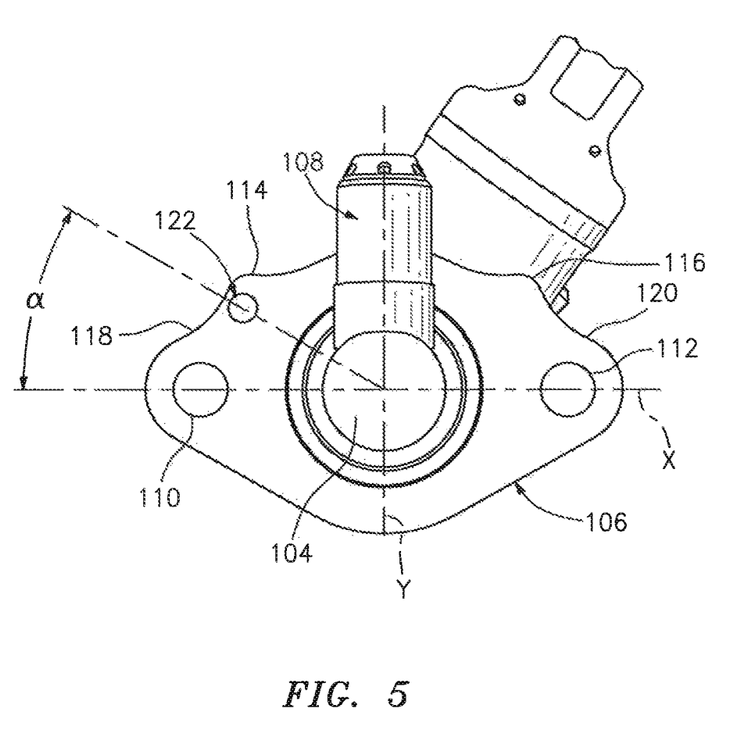
FIG. 5 is an expanded bottom view of a fuel injector flange.

With reference to FIG. 5, the mount flange 106 is shown about an X-axis and a Y-axis. A first aperture 110 and a second aperture 112 are located along the X-axis that flank the support 104. An extended area 114, 116 is located along a respective first side 118 and second side 120. Although the mount flange 106 defines a particular symmetrical geometry in the illustrated non-limiting embodiment, it should be appreciated that other geometries will benefit herefrom.

Figure 6:
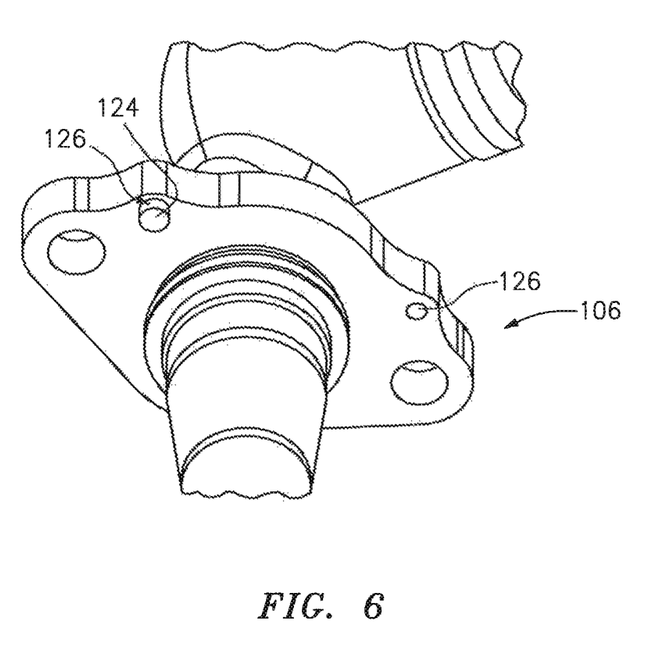
FIG. 6 is a bottom view of a fuel injector flange according to one disclosed non-limiting embodiment.
Figure 7:
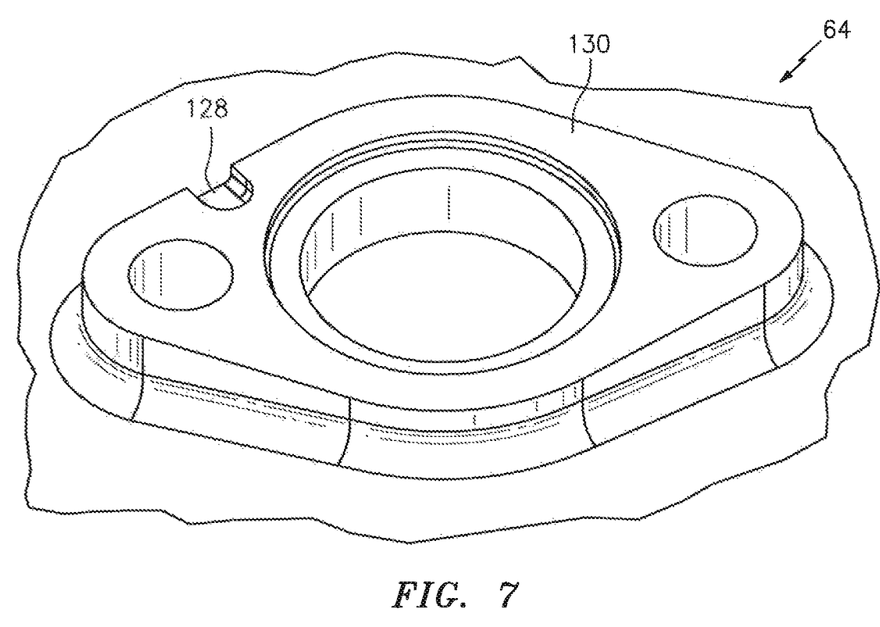
FIG. 7 is an expanded isometric view of a fuel injector pad.

One of the extended areas 114, 116 includes a first locator 122 in the Z-direction. The first locator 122 in one disclosed non-limiting embodiment may be a pin 124 that is fitted into on of a multiple of apertures 126 (FIG. 6). The first locator 122 in another disclosed non-limiting embodiment is an integral raised area. The first locator 122 in another disclosed non-limiting embodiment is an aperture or a slot. The first locator 122 provides a mistake-proofing feature on the underside of the mount flange 106 that interfaces with a second locator 128 such as a hole, slot or pin in a fuel nozzle pad 130 on the diffuser case 64 (FIG. 7) that indexes with the first locator 122.

Figure 8:
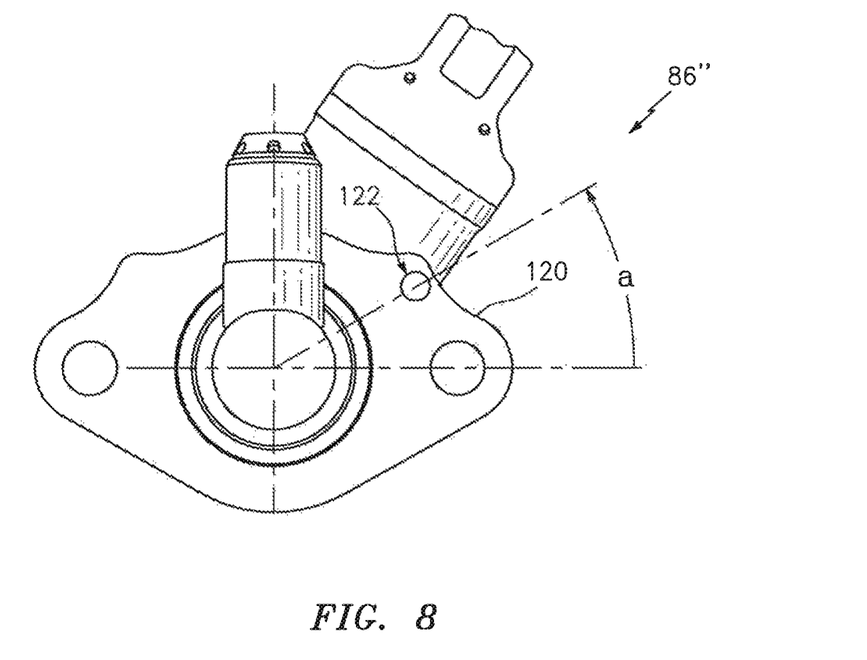
FIG. 8 is a bottom view of a fuel injector flange according to another disclosed non-limiting embodiment.
Figure 9:
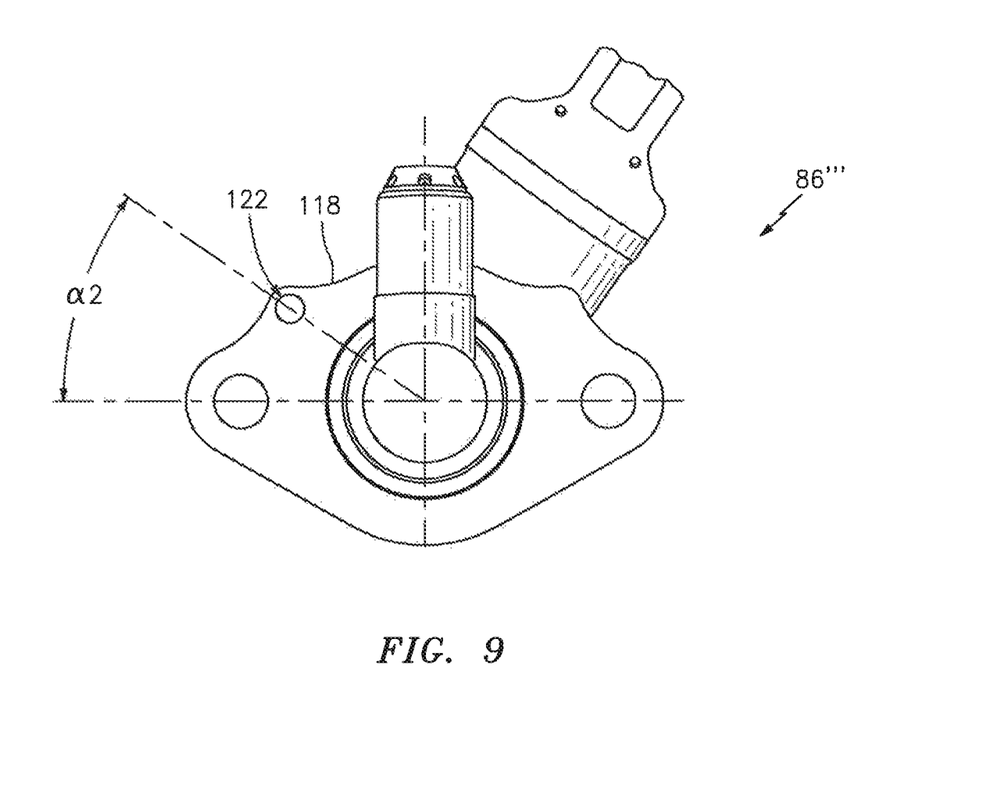
FIG. 9 is a bottom view of a fuel injector flange according to another disclosed non-limiting embodiment.
Figure 10:
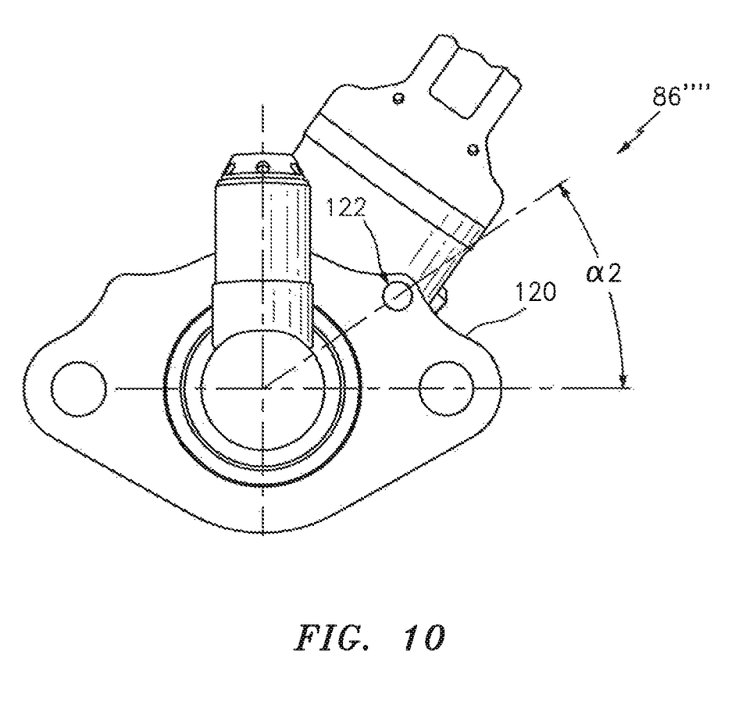
FIG. 10 is a bottom view of a fuel injector flange according to another disclosed non-limiting embodiment.

The combination of the second locator 128 in the fuel nozzle pad 130 and the associated first locator 122 match only when the correct fuel nozzle 86. For example, another fuel nozzle 86" may include a first locator 122 at a first predefined angle along the second extended area 116 (FIG. 8); another fuel nozzle 86''' may include a first locator 122 at a second predefined angle along the first extended area 114 (FIG. 9); and yet another fuel nozzle 86'''' may include a first locator 122 at a second predefined angle along the second extended area 114 (FIG. 10).

Each fuel nozzle 86 is thereby associated with a particular fuel nozzle pad 130 on the diffuser case 64 (FIG. 6) that has an associated positioned second locator 128. The second locator 128—being a slot or hole—may be readily machined into a common fuel nozzle pad 130. That is, all of the multiple of fuel nozzle pads 130 on the diffuser case 64 may be identical with only a particular second locator 128 being different to permit installation of only the proper fuel nozzle 86 in a mistake-proof manner. Mistake-proofing beneficially protects against backwards installation, simplex/duplex mix-ups, and cross-engine mix-ups through the physical prevention of mis-installation.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor section for a gas turbine engine comprising:
   a first fuel nozzle with a first flange having a first locator;
   a second fuel nozzle with a second flange having a second locator;
   each of the first flange and the second flange comprising a first aperture and a second aperture, wherein for each of the first flange and the second flange an x-axis intersects a flange center axis, the first aperture, and the second aperture and a y-axis intersects the flange center axis and is perpendicular to the x-axis;
   each of the first flange and the second flange comprising a perimeter extending about the flange center axis, the perimeter of each of the respective first flange and second flange comprising at least a first side and a second side adjacent the first side and opposite the first side with respect to the y-axis, the first side comprising a first extended area projecting from the first side in a first direction away from the flange center axis of each of the respective first flange and second flange and the second side comprising a second extended area projecting from the second side in a second direction away from the flange center axis of each of the respective first flange and second flange, wherein the first locator is located in the first extended area of the first flange and only on the first side of the first flange and the second locator is located in the second extended area of the second flange and only on the second side of the second flange;
a diffuser case with a first fuel nozzle mount pad and a second fuel nozzle mount pad;
wherein the first fuel nozzle mount pad includes a third locator; wherein the second fuel nozzle mount pad includes a fourth locator;
wherein the first locator is indexed with the third locator;
wherein the second locator is indexed with the fourth locator;
wherein the third locator is different from the fourth locator to permit installation of the first fuel nozzle on the first fuel nozzle mount pad and to prevent installation of the second fuel nozzle on the first fuel nozzle mount pad.

2. The combustor section as recited in claim 1, wherein said first locator extends from said first flange.

3. The combustor section as recited in claim 2, wherein said first locator is a pin.

4. The combustor section as recited in claim 1, wherein said third locator is a slot.

5. The combustor section as recited in claim 1, wherein said first flange includes a first aperture and a second aperture.

6. The combustor section as recited in claim 1, wherein the fourth locator permits installation of the second fuel nozzle on the second fuel nozzle mount pad and prevents installation of the first fuel nozzle on the second fuel nozzle mount pad.

7. The combustor section as recited in claim 1, wherein the first fuel nozzle is a simplex fuel nozzle.

8. The combustor section as recited in claim 7, wherein the second fuel nozzle is a simplex fuel nozzle.

9. The combustor section as recited in claim 7, wherein the second fuel nozzle is a duplex fuel nozzle.

10. The combustor section as recited in claim 1, wherein the first fuel nozzle is a duplex fuel nozzle.

11. The combustor section as recited in claim 10, wherein the second fuel nozzle is a duplex fuel nozzle.

12. The combustor section of claim 1, wherein each of the first fuel nozzle mount pad and the second fuel nozzle mount pad comprise a pad center axis, a nozzle aperture extending along the pad center axis, a pad perimeter surrounding and facing away from the pad center axis, and a pad mating surface extending between the nozzle aperture and the pad perimeter.

13. The combustor section as recited in claim 12, wherein the third locator is a first slot formed through the pad perimeter and the pad mating surface of the first fuel nozzle mount pad, and wherein the fourth locator is a second slot formed through the pad perimeter and the pad mating surface of the second fuel nozzle mount pad.

14. The combustor section of claim 12, wherein each of the first flange and the second flange comprises a nozzle support extending outward from each of the respective first flange and second flange along the flange center axis, wherein each of the first flange and the second flange comprises a flange mating surface extending between the nozzle support and the perimeter of each of the respective first flange and second flange, the first locator and the second locator projecting outward from the respective flange mating surface of the respective first flange and second flange, and wherein the flange mating surface of each of the first flange and the second flange is configured to mate with the respective pad mating surface of the respective first fuel nozzle mount pad and second fuel nozzle mount pad.

15. The combustor section of claim 1, wherein each of the first flange and second flange comprises a first pin aperture in the first extended area and a second pin aperture in the second extended area and wherein the first flange comprises a first pin fitted in the first pin aperture forming the first locator and the second flange comprises a second pin fitted in the second pin aperture forming the second locator.

16. A combustor section for a gas turbine engine comprising:
a simplex fuel nozzle with a first flange having a first locator;
a duplex fuel nozzle with a second flange having a second locator;
a diffuser case with a simplex fuel nozzle mount pad and a duplex fuel nozzle mount pad;
wherein the simplex fuel nozzle mount pad includes a third locator;
wherein the duplex fuel nozzle mount pad includes a fourth locator;
wherein the first locator is indexed with the third locator;
wherein the second locator is indexed with the fourth locator;
wherein the third locator is different from the fourth locator to permit installation of the simplex fuel nozzle on the simplex fuel nozzle mount pad and to prevent installation of the duplex fuel nozzle on the simplex fuel nozzle mount pad;
wherein each of the first flange and the second flange comprise a first aperture and a second aperture, wherein for each of the first flange and the second flange an x-axis intersects a flange center axis, the first aperture, and the second aperture and a y-axis intersects the flange center axis and is perpendicular to the x-axis; and
wherein each of the first flange and the second flange comprise a perimeter extending about the flange center axis, the perimeter of each of the respective first flange and second flange comprising at least a first side and a second side adjacent the first side and opposite the first side with respect to the y-axis, the first side comprising a first extended area projecting from the first side in a first direction away from the flange center axis of each of the respective first flange and second flange and the second side comprising a second extended area projecting from the second side in a second direction away from the flange center axis of each of the respective first flange and second flange, wherein the first locator is located in the first extended area of the first flange and only on the first side of the first flange and the second locator is located in the second extended area of the second flange and only on the second side of the second flange.

* * * * *